United States Patent [19]

Brecker et al.

[11] 4,447,569

[45] May 8, 1984

[54] POLYVINYL CHLORIDE RESIN COMPOSITIONS HAVING A HIGH VOLUME RESISTIVITY AND RESISTANCE TO DETERIORATION WHEN HEATED AT TEMPERATURES ABOVE 100 DEGREES C.

[75] Inventors: Lawrence R. Brecker, Brooklyn; Charles Keeley, Wantagh; Stuart D. Brilliant, Levittown, all of N.Y.

[73] Assignee: Argus Chemical Corporation, Brooklyn, N.Y.

[21] Appl. No.: 433,563

[22] Filed: Oct. 8, 1982

[51] Int. Cl.$^3$ .......................... C08K 5/05; C08L 27/06
[52] U.S. Cl. .................................... 524/109; 524/297; 524/298; 524/329; 524/425; 524/445; 524/567; 524/569
[58] Field of Search ............... 524/329, 109, 297, 298, 524/425, 445, 567, 569

[56] References Cited

U.S. PATENT DOCUMENTS

| 2,141,126 | 12/1938 | Doolittle | 524/329 |
|---|---|---|---|
| 2,231,595 | 2/1941 | Safford et al. | 524/329 |
| 2,340,151 | 1/1944 | Staley | 524/329 |
| 2,912,397 | 11/1959 | Houska et al. | 524/114 |
| 2,984,593 | 5/1961 | Isaksen et al. | 264/231 |
| 3,824,202 | 7/1974 | White et al. | 524/400 |
| 3,849,352 | 11/1974 | Reed et al. | 524/329 |
| 3,867,325 | 2/1975 | Hutton et al. | 524/329 |
| 4,327,021 | 4/1982 | Davis et al. | 524/297 |
| 4,343,727 | 8/1982 | Cohen | 524/109 |

FOREIGN PATENT DOCUMENTS

| 701447 | 1/1965 | Canada | 524/329 |
|---|---|---|---|
| 802326 | 2/1981 | U.S.S.R. | 524/329 |

Primary Examiner—Ronald W. Griffin

[57] ABSTRACT

Polyvinyl chloride resin compositions are provided, suitable for use as electrical insulation material, having a high volume resistivity and a high resistance to deterioration when heated at temperatures above 100° C., comprising as the essential ingredients a polyvinyl chloride resin and, in the amounts indicated, in parts per one hundred of resin, from about 30 to about 100 parts mono or poly carboxylic acid ester plasticizer; from about 5 to about 25 parts filler; from about 1 to about 20 parts epoxy compound, and from about 1 to about 20 parts lead alkyl phenolate.

18 Claims, No Drawings

POLYVINYL CHLORIDE RESIN COMPOSITIONS HAVING A HIGH VOLUME RESISTIVITY AND RESISTANCE TO DETERIORATION WHEN HEATED AT TEMPERATURES ABOVE 100 DEGREES C.

Polyvinyl chloride resins are now widely used in the formulation of wire and cable insulation materials. As Houska and Lurie have pointed out, U.S. Pat. No. 2,912,397, patented Nov. 10, 1959, polyvinyl chloride resins have themselves good electrical characteristics and are substantially unaffected by moisture, oil, acids and alkali, Plasticizers are employed in order to render the compositions flexible so that when they are applied to wires, cables and the like they can be bent and pulled around angles, conduits, etc. Other materials are added in comparatively minor quantities, e.g., so-called stabilizers, which serve to retard the chemical decomposition caused by the splitting out of hydrogen chloride from the vinyl resin when it is subjected to severe heating. Lubricants such as mineral oil are often included and the composition may be colored if desired by the addition of pigments, dyes and the like. Fillers, for instance, barytes, whiting, clay and fuller's earth, may also be added.

A preferred filler for vinyl resin compositions which are intended for use in connection with electrical insulation is clay. Clay improves the electrical resistivity of the composition and renders it more scratch- and crease-resistant than mineral fillers such as whiting.

Over the years specialized formulations of polyvinyl chloride resins have accordingly been developed, referred to as "electrical grade polyvinyl chloride," especially formulated for use as wire and cable insulation, and containing as the essential ingredients the polyvinyl chloride resin, plasticizer, filler (usually clay), and heat stabilizer, with lubricants, pigments and other modifiers optional. Electrical grade polyvinyl chloride resin must have a high electrical resistivity, which can be expressed in terms of a high volume resistivity, in excess of $10^{11}$ ohm-cm and preferably in excess of $10^{12}$ ohm-cm, measured in water at 60° C. This property applies to all classes of wire.

Additional specifications have been developed that vary according to the requirements of specific industrial groups, such as the automobile industry, the communications industry, the wire and cable manufacturing industry, and the electrical appliance industry, with the result that minimum standards have been established by the various industries, and also by regulatory groups such as the Underwriters' Laboratories, normally specified with respect to chemical and/or physical degradation, retention of tensile strength and elongation after aging at elevated temperatures, and electrical properties, such as volume resistivity. Underwriters' Laboratories, for example, specifies DC insulation resistance as being a minimum of 125 megohms/1000 feet measured at 23° C. and a minimum of 0.084 megohms/1000 feet measured at 60° C. Nonetheless, there are certain minimum standards that should be met in all cases.

White and Augustyn U.S. Pat. No. 3,824,202, patented July 16, 1974, note that polyvinyl chloride resin compositions used as insulation for electrical wiring have to meet Underwriters' Laboratories specifications at temperatures as high as 105° C. Such material is known commercially as 105° C. wire, and this is the highest class of polyvinyl chloride resin insulation approved by Underwriters' Laboratories. However, recent industry demands have made it necessary to develop 120° C. wire compositions that will resist chemical and/or physical degradation and retain the desirable electrical properties at still higher temperatures.

Accordingly, in order to be designated as "electrical grade polyvinyl chloride resin", the material should meet the following minimum standards:

| °C. Wire | Original Tensile (psi) | Original Elongation (%) | % Retention on aging for 7 days at | Tensile | Elongation |
|---|---|---|---|---|---|
| 60 | 1500 | 100 | 100° C. | 65 | 65 |
| 75 | 2000 | 150 | 121° C. | 75 | 50 |
| 90 | 2000 | 150 | 136° C. | 75 | 65 |
| 105 | 1500 | 100 | 136° C. | 70 | 65 |

Insulation Resistance at least 125 megohms/1000 feet at 23° C. and at least 0.084 megohm/1000 feet at 60° C.

The imposition of a requirement for resistance to heating at elevated temperatures at which the electrical specifications must continue to be met has made it necessary to include effective heat stabilizers in electrical grade polyvinyl chloride resin compositions, and has also imposed special requirements upon the plasticizers that are employed, which must retain their plasticizing effect and resist decomposition at these elevated temperatures. Many commonly used stabilizers and plasticizers cannot be used in electrical grade polyvinyl chloride resin compositions because they reduce the electrical resistance. For example, plasticizers such as tricresyl phosphate and dioctyl phthalate reduce volume resistivity in inverse proportion to the amount of such plasticizer present, as shown in the following Table:

| Effect of Dioctyl Phthalate on Volume Resistivity | | | | |
|---|---|---|---|---|
| Parts by Weight | | Stress at 100% Elongation | Shore Durometer | Volume Resistivity |
| PVC | DOP | (psi) | D Hardness | (ohm-cm) |
| 100 | 0 | — | 75 | $1.5 \times 10^{16}$ |
| 100 | 25 | 3700 | 67 | $2.7 \times 10^{15}$ |
| 100 | 50 | 1600 | 34 | $1.3 \times 10^{14}$ |
| 100 | 75 | 800 | 18 | $1.2 \times 10^{13}$ |
| 100 | 100 | 515 | 14 | $1.8 \times 10^{12}$ |
| 0 | 100 | — | — | $1.4 \times 10^{11}$ |

The cause for the decreased resistivity is the decreased volume of polymer (per unit volume) and the higher polarity of the plasticizer.

Lead salts, as used by Houska et al U.S. Pat. No. 2,912,397, particularly inorganic lead salts, such as lead carbonate, lead orthosilicate, coprecipitated lead orthosilicate and silicate, tribasic lead sulfate, dibasic lead phosphate, white lead (mixture of the carbonate and hydroxide), lead salts of organic acids such as lead stearate, dibasic lead stearate, lead maleate, lead fumarate, lead tartrate, lead salicylate, dibasic lead phthalate, basic lead hydroxynaphthenate, lead palmitate, lead laurate, lead abietate and the like; and commercial mixtures of neutral and basic salts such as are prepared by fusing together lead oxide and a suitable organic acid such as stearic, salicylic, etc., do not materially reduce volume resistivity, and are therefore widely used in polyvinyl chloride resin insulation compositions. White et al U.S. Pat. No. 3,824,202 employ similar lead compounds, such as lead silicate, lead chlorosilicate, tribasic lead sulfate, basic and normal lead stearate, dibasic lead stearate, and lead-barium and lead-tin complex mixtures. However, these salts are dusty solids, and require specialized handling techniques to minimize workplace exposure. Previously suggested liquid lead stabilizers, such as lead 2-ethylhexoate (also known as lead octoate), are not compatible with polyvinyl chloride electrical insulation grade compositions, forming waxy deposits or bloom on the surface of the compositions in the course of time.

In accordance with the present invention, it has been determined that liquid lead alkyl phenolates are fully compatible with polyvinyl chloride electrical grade resin compositions, and not only impart the requisite resistance to heat deterioration at elevated temperatures above 100° C., but also increase volume resistivity at ordinary and elevated temperatures as well, the volume resistivity being directly proportional to the amount of liquid lead alkyl phenolate present in the composition. In addition, liquid lead alkyl phenolates function as plasticizers, and thus the amount of plasticizer required for a given degree of plasticity can be reduced, with an additional favorable effect upon volume resistivity, inasmuch as plasticizers reduce volume resistivity in proportion to the amount of plasticizer present.

The invention accordingly provides polyvinyl chloride resin compositions that are suitable for use as electrical insulation material, having a high volume resistivity and a high resistance to deterioration when heated at temperatures above 100° C., comprising as the essential ingredients a polyvinyl chloride resin and, in the amounts indicated, in parts per one hundred of resin, from about 30 to about 100 parts mono or poly carboxylic acid ester plasticizer; from about 5 to about 25 parts filler; from about 1 to about 20 parts epoxy compound; and from about 1 to about 20 parts lead alkyl phenolate.

In comparison to similar electrical grade polyvinyl chloride resin compositions in which solid lead compounds such as tribasic lead sulphate are used as the heat stabilizer, the compositions in accordance with the invention containing liquid lead alkyl phenolate are equivalent to or slightly superior in volume resistivity. In addition, the compositions in accordance with the invention, apparently because of the liquid character of the lead alkyl phenolate, show a lesser tendency to form pinholes in the coating, when extruded on wire or cable, so that the coating need not be as thick as when similar compositions containing solid lead stabilizers are used.

The volume resistivity of electrical grade compositions of polyvinyl chloride resin is inversely related to temperature. However, the resistivity/temperature curves for liquid lead alkyl phenolate stabilizers have a less steep slope than the resistivity/temperature curves for similar compositions containing solid lead stabilizers, so that in 90° C. or 105° C. or 120° C. wire at elevated temperatures the advantage of the liquid lead alkyl phenolate stabilizer is considerable.

The electrical resistance of wire insulated with electrical grade polyvinyl chloride resin compositions is reduced when the composition is wet, but the compositions in accordance with the invention containing liquid lead alkyl phenolate are less affected by water than similar compositions containing solid lead stabilizers.

The lead alkyl phenolate stabilizers in accordance with the invention are defined by the formula:

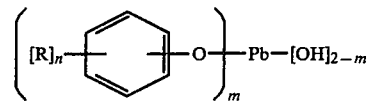

wherein:

R is an alkyl group having from one to about eighteen carbon atoms; preferably from about four to about fourteen carbon atoms;

n is a number from 1 to 4, preferably 1; and m is 1 or 2.

The compounds wherein m is 1 are basic lead alkyl phenolates. When m is 2, the compounds are normal lead alkyl phenolates, which are preferred.

Exemplary alkyl groups include methyl, ethyl, propyl, isopropyl, butyl, isobutyl, secondary-butyl, tertiary-butyl, amyl, isoamyl, tertiary-amyl, hexyl, isohexyl, secondary-hexyl, tertiary-hexyl, heptyl, isoheptyl, octyl, 2-ethyl-hexyl, isooctyl, nonyl, isononyl, tertiary-nonyl, decyl, undecyl, dodecyl, tridecyl tetradecyl, hexadecyl, and octadecyl. All lead alkyl phenolates in this class are either liquid or glassy at normal atmospheric temperatures, as well of course as any elevated temperatures to which the electrical grade compositions are to be subjected in use, or if not are readily liquefied by blending with less than an equal weight of aromatic hydrocarbon or plasticizer.

Some liquid lead phenolates that can be used include the normal and basic lead salts of n-butyl phenol, isoamyl phenol, isooctyl phenol, 2-ethylhexyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, and di-t-dodecyl phenol.

Any conventional filler can be employed, including, for example, talc; calcium carbonate; clay, including bleached and unbleached clays, coated clays, and dry-process clays, either calcined or uncalcined; whiting; barytes, fuller's earth; magnesium silicate, anhydrous aluminum silicate; titanium dioxide; barium sulfate, strontium sulfate, calcium sulfate, and magnesium oxide.

If a plasticizer is required, an aliphatic, cycloaliphatic or aromatic mono or poly carboxylic acid ester is employed, as defined by the formula:

wherein:

Z is selected from the group consisting of an aliphatic nucleus having from one to about thirty carbon atoms; a cycloaliphatic nucleus having from four to about thirty carbon atoms; and an aromatic nucleus having an aromatic ring structure of six or ten carbon atoms and a total of from six to about thirty carbon atoms. When the aromatic ring is a benzene ring, the structure is

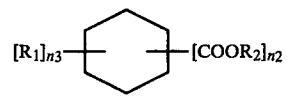

wherein:

$R_1$ is an alkyl group having one to about eighteen carbon atoms; and $n_2$ is a number from 1 to 4;

$R_2$ is an alkyl group having from one to about eighteen carbon atoms; and $n_3$ is a number from 0 to 4.

The carboxylic acid ester should have a total of from twenty to about 150 carbon atoms, including both the Z and $COOR_1$ groups.

These esters are liquids, and are compatible with electrical grade polyvinyl chloride resin compositions, in addition to not deleteriously affecting electrical properties.

Exemplary $R_1$ and $R_2$ alkyl are the same as those named above for R.

Exemplary aliphatic carboxylic acids include acetic, propionic, butyric, valeric, capric, caproic, lauric, myristic, palmitic, stearic, oleic, linoleic, oxalic, adipic, sebacic, malonic, succinic, suberic, pimelic, azelaic and glutaric.

Exemplary cycloaliphatic acids include cyclobutanoic, cyclopentanoic, cyclohexanoic and cycloheptanoic acids.

Exemplary aromatic carboxylic acids include benzoic acid, phthalic acid, cinnamic acid, trimellitic acid, terephthalic acid, and pyromellitic acid.

Some plasticizers in this class that can be used are di-isotridecyl phthalate, tri-2-ethylhexyl trimellitate, dioctyl phthalate, butyl benzyl phthalate, dibutyl sebacate, di-isononyl adipate, and polyesters of alkanediols and/or alkanedioic acids, with alkanoic acids and/or alkanols to regulate the molecular weight in the 800–4000 range.

Any epoxy compound adequately refined to remove ionic impurities such as sodium chloride can be used. The epoxy compounds are organic compounds containing at least one epoxy group.

The epoxy compounds can be aliphatic or cycloaliphatic in character, but aromatic, heterocyclic and alicyclic groups can also be present.

The epoxy compounds have from 10 to 150 carbon atoms. The longer chain aliphatic compounds of 22 carbon atoms and more are also plasticizers. Typical epoxy compounds that are not plasticizers are epoxy carboxylic acids such as epoxy stearic acid, glycidyl ethers of polyhydric alcohols and phenols, such as triglycidyl glycerol, diglycidyl ether of diethylene glycol, glycidyl epoxy stearyl ether, 1,4-bis(2,3-epoxy propoxy) benzene, 4,4'-bis(2,3-epoxy propoxy) diphenyl ether, 1,8,-bis(2,3-epoxy propoxy) octane, 1,4-bis(2,3-epoxy propoxy) cyclohexane, and 1,3-bis(4,5-epoxy pentoxy), 5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxy phenyl) propane (Bisphenol A), 2,2-bis(4-hydroxy phenyl) butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrin.

Typical epoxy compounds that combine stabilizing with plasticizing action are the epoxy higher esters having from 22 to 150 carbon atoms. Such esters will initially have had unsaturation in the alcohol or acid portion of the molecule, which is taken up by the formation of the epoxy group. These epoxy compounds can be used weight for weight as plasticizers in part replacement of the plasticizer component, but not in amounts exceeding the upper weight limit for epoxy compound.

Typical unsaturated acids are acrylic, oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized glycerol trioleate, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

The term "polyvinyl chloride" as used herein is inclusive of any polymer formed at least in part of the recurring group

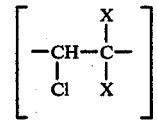

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides such as those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, and ethylene. The invention also is applicable to mixtures of polyvinyl chloride in a major proportion with other synthetic resins such as chlorinated polyethylene or a copolymer of acrylonitrile, butadiene and styrene. Among the polyvinyl chlorides which can be stabilized are the uniaxially stretch-oriented polyvinyl chlorides described in U.S. Pat. No. 2,984,593 to Isaksem et al., that is, syndiotactic polyvinyl chloride, as well as atactic and isotactic polyvinyl chlorides.

In addition to these ingredients, which are the essential ingredients, the electrical grade polyvinyl chloride resin compositions in accordance with the invention can include other conventional components of such compositions, such as flame retardants, for example, antimony trioxide; pigments; lubricants, such as the higher aliphatic acids having from twelve to twenty-four carbon atoms such as stearic acid, lauric acid, palmitic acid and myristic acid, mineral lubricating oils, polyvinyl stearate, polyethylene, paraffin wax; mineral oil, paraffin oil, and vegetable waxes; light stabilizers such as 2,2,6,6-tetramethyl piperidyl compounds; and similar additives.

The liquid lead alkyl phenolate stabilizers employed in the composition of the invention can be formulated for marketing as a heat stabilizer composition to manufacturers of electrical grade polyvinyl chloride resin compositions or insulated wire and cable manufacturers by mixing with an inert solvent or with any liquid lubricant or plasticizer in suitable concentrations, ready to be added to the resin composition to give an appropriate heat stabilizer and lubricant or plasticizer concentration in the resin. Other stabilizers and stabilizer adjuncts and adjuncts of electrical grade polyvinyl chloride resin compositions can be incorporated as well.

The preparation of the electrical grade polyvinyl chloride resin composition is easily accomplished by conventional procedures. The ingredients are blended with the polyvinyl chloride resin, individually or together, as in the case of the stabilizer composition as just described above, using for instance a two- or three-roll mill at a temperature at which the mix is fluid and thorough blending faciliated, milling the resin composition including any plasticizer at from 250° to 375° F. for a time sufficient to form a homogeneous mass, five minutes, usually. After the mass is uniform, it is sheeted off in the usual way, or extruded onto the wire or cable as the insulation sheath.

For the commercial processing of the ingredients together with a small amount of polyvinyl chloride, the ingredients are conveniently mixed with a portion of the polymer to be stabilized with vigorous agitation, under such conditions of time and temperature that the stabilizer is sufficiently imbibed by the polymer to produce a dry free-flowing powder. The well known Henschel mixture is well suited to this procedure. The resulting stabilized resin concentrate can be marketed as such, for blending with more polyvinyl chloride resin by the wire or cable manufacturer in extruding the insulation coating.

The lead alkyl phenolate stabilizer, plasticizer, filler and epoxy compound can also be directly mixed with the polyvinyl chloride just before extrusion.

The resin composition fed to a wire coating extruder can be in one of two forms, powder dry blend or fluxed pellets. The former has the advantage of lower cost and less heat history, but requires an efficient compounding extruder with high compression ratio and a screw length/diameter ratio approximately 20/1. Generally, pellets are used by wire coaters who purchase their compounds, either because they have no dry blending facilities or because they are using exotic compounds in relatively short runs.

A dry blend resin composition for electrical applications is made in a jacketed ribbon blender or in a high shear intensive mixer such as a Henschel mixer. The cycles are about 30 minutes for 1000 lb or 10 minutes for 450 lb in the Henschel mixer.

When using a ribbon blender, the resin and stabilizer are first tumbled with a steam pressure from 0 to 20 psi on the jacket. Plasticizer preheated to 150° to 200° F. is then sprayed by suitable means onto the resin. Approximately 15 minutes after the last of the plasticizer is added the mix is dry enough to add the fillers and lubricant. Adding these ingredients earlier has two disadvantages, the filler would tend to absorb plasticizer and ball up, and the lubricant would coat the resin and slow down the plasticizer absorption. When judged dry, the blend has to be cooled either in the same ribbon blender by introducing cold water into the jacket, or more quickly by transfer to another ribbon blender, which is kept cold. In either case, the resulting dry blend has to be passed through a screen to eliminate agglomerates. This method of dry blending takes approximately 45 minutes to one hour per batch, depending on the method of cooling.

Making dry blend in an intensive mixer requires less time than the above method. Again, the resin and stabilizer are first added and are brought up to temperature by the frictional heat generated by high shear mixing action. At approximately 150° F. the plasticizers are pumped in, and finally the fillers are added when the temperature reaches 175° F. The compound is generally dry before the temperature reaches 200° F., and the whole process required about 5 to 7 minutes. The dry blend has to be discharged to a suitable cooling apparatus.

Fluxed pellets can be prepared in a variety of ways. The ingredients are either wet blended in a cold ribbon blender or similar low shear mixer or dry blended in a heated ribbon blender or high shear intensive mixer. In the simplest operation this blend can be fluxed on a heated two roll mill and fed in strip form to a dicer in which it is cut into $\frac{1}{8}$" cubes. For higher rates of production the blend can be fed to a Banbury mixer, where it is fluxed, and thence to mills for final mixing and dicing. The blend can also be fed to a compounding extruder or other type continuous mixer, and then pelletized or diced.

In general, in the wire coating process, molten polyvinyl chloride resin composition is extruded into a crosshead through which passes the wire. On emerging from the head the coated wire is cooled in a water bath, continuously tested, and wound on a reel.

The extruder is usually a single screw machine with a compression ratio of 4:1 for dry blend and 3:1 for pellets. The length to diameter ratio of the screw ranges from 17:1 to 24:1. Output rates depend on wall thickness, from 200 ft/min for heavy gauge to 5000 ft/min for thin gauge insulated wire. Printed markings may be applied before the wind-up.

The coating can be applied to a wire as small as 0.008 inch in diameter, or to cables 5 inches and larger. Consequently, extruders are used which have diameters from 1½ to 10 inches, putting out from 10 to over 1000 pounds per hour. Linear speed is usually the limit to output; the payoff and take-up speeds reach practical maximum speeds. Speeds of 4000 feet per minute are reached in the production of small telephone wires. Top speeds go down as diameter increase, and 20 to 100 feet per minute is common for heavy cables.

Preheating of the conductor prevents premature shrinkage of the hot resin composition away from the metal surface. This shrinkage sets up strains in the plastic, which then becomes much more susceptible to cracking when warmed. Preheating affects adhesion of the resin composition to the metal, and offers a way of controlling this adhesion; such control is important if the wire ends must be stripped in service.

The two basic wire-covering dies are "pressure" and "tubing." In both types the conductor passes through the cross-head in a "guider tip." In the pressure die, the vinyl is still under some pressure inside the die when it contacts the conductor, which leaves the die already coated. The tubing die extrudes a plastic tube around the emerging conductor. This tube is drawn around the conductor just after the die face by a vacuum drawn through the same passage in which the conductor travels.

Primary insulation usually is run through pressure dies, which give the best adhesion and least strains. Jacketing, on the other hand, is usually run through tubing dies, especially where an irregular cross section such as a group of wires is to be covered.

Wire and cable covering is tested in line more than any other extruded product. Spark testing is almost universal. The wire passes through a high-voltage field, and if there are any breaks, pin holes, or thin spots in the covering, a circuit is completed to the conductor and a signal buzzer or light is set off. Diameter is measured mechanically or electrically. Mechanical devices must be very precisely constructed to measure the tiny differences in the wire. The electrical devices are more accurate, especially for the smaller wires. They usually measure capacitance of the covering at a given point in the wire and resulting electrical impulse is fed back to the extruder drive.

The following Examples in the opinion of the inventors represent preferred embodiments of the invention.

The mixtures were milled on a two-roll mill at 350° F. for three minutes, and then sheeted off. Heat resistance of the resulting compositions was evaluated in terms of the retention of tensile and elongation properties after oven aging for 7 days at 136° C. (ASTM D 2633), and volume resistivity was measured in water at 60° C., in accordance with ASTM D 257.

The following results were obtained in the volume resistivity test:

TABLE II

| Compound | | Volume Resistivity (Ohm-cm) in H$_2$O at 60° C. | | | |
|---|---|---|---|---|---|
| | | Initial | 1 day | 3 days | 7 days |
| Control | A | $8.82 \times 10^{13}$ | $5.22 \times 10^{13}$ | $4.82 \times 10^{13}$ | $8.35 \times 10^{13}$ |
| | B | $9.54 \times 10^{13}$ | $9.8 \times 10^{13}$ | $7.78 \times 10^{13}$ | $1.12 \times 10^{14}$ |
| Example | 1 | $4.23 \times 10^{13}$ | $3.18 \times 10^{13}$ | $2.65 \times 10^{13}$ | $3.02 \times 10^{13}$ |
| | 2 | $1.01 \times 10^{14}$ | $7.99 \times 10^{13}$ | $4.85 \times 10^{13}$ | $1.17 \times 10^{14}$ |
| | 3 | $1.88 \times 10^{14}$ | $1.28 \times 10^{14}$ | $7.19 \times 10^{13}$ | $1.61 \times 10^{14}$ |
| | 4 | $1.81 \times 10^{14}$ | $1.07 \times 10^{14}$ | $1.02 \times 10^{14}$ | $9.03 \times 10^{13}$ |
| | 5 | $1.56 \times 10^{14}$ | $1.56 \times 10^{14}$ | $8.64 \times 10^{13}$ | $1.27 \times 10^{14}$ |

Results of the heat resistance tests are included in Table III.

TABLE III

| Heat Resistance | Controls | | Examples | | | | |
|---|---|---|---|---|---|---|---|
| | A | B | 1 | 2 | 3 | 4 | 5 |
| Tensile strength psi, initial | 2250 | 2280 | 2120 | 2250 | 2100 | 2200 | 2230 |
| Tensile strength psi, after 7 days 136° C. | 2210 | 2300 | 2240 | 2290 | 2200 | 2300 | 2300 |
| Elongation at break, % initial | 360 | 340 | 350 | 350 | 345 | 340 | 340 |
| Elongation at break, % after 7 days 136° C. | 280 | 290 | 310 | 300 | 300 | 300 | 310 |
| % retention of tensile | 98 | over 100 | over 100 | over 100 | over 100 | over 100 | over 100 |
| % retention of elongation | 78 | 85 | 89 | 86 | 87 | 88 | 91 |

EXAMPLES 1 TO 5

A series of electrical grade plasticized polyvinyl chloride resin compositions was prepared, having the formulations listed in Table I below.

EXAMPLES 6 TO 12

A series of electrical grade plasticized polyvinyl chloride resin compositions was prepared, having the formulations listed in Table IV below.

TABLE I

| | Parts By Weight | | | | | | |
|---|---|---|---|---|---|---|---|
| | Controls | | Examples | | | | |
| | A | B | 1 | 2 | 3 | 4 | 5 |
| Homopolymer of vinyl chloride | 100 | 100 | 100 | 100 | 100 | 100 | 100 |
| Tri-2-ethylhexyl trimellitate | 42 | 42 | 42 | 42 | 42 | 42 | 42 |
| Calcined clay | 10 | 10 | 10 | 10 | 10 | 10 | 10 |
| 160° F. paraffin | 0.34 | 0.34 | 0.34 | 0.34 | 0.34 | 0.34 | 0.34 |
| Antimony trioxide | 3.4 | 3.4 | 3.4 | 3.4 | 3.4 | 3.4 | 3.4 |
| Uncoated calcium carbonate | 10 | 10 | 10 | 10 | 10 | 10 | — |
| Coated calcium carbonate | — | — | — | — | — | — | 10 |
| Di-isotridecyl phthalate | 12 | 7 | 7 | 1 | — | 1 | 1 |
| Dibasic lead phthalate PbC$_8$H$_4$O$_4$.2Pb | 5 | 5 | — | — | — | — | — |
| Lead silicate-chloride | 3 | 3 | — | — | — | 3.0 | — |
| Epoxy soybean oil | — | 5 | 5 | 5 | 5 | 5 | 5 |
| Lead nonylphenolate (24% Pb) | — | — | 6.0 | 6.0 | 12.0 | 5.0 | 6.0 |
| Stearic acid | — | — | 0.5 | 0.5 | 0.5 | 0.5 | 0.5 |

TABLE IV

| | Parts By Weight | | | | | | | | |
|---|---|---|---|---|---|---|---|---|---|
| | Controls | | Examples | | | | | | |
| | C | D | 6 | 7 | 8 | 9 | 10 | 11 | 12 |
| Polyvinyl chloride homopolymer (Diamond 450) | 100 | 100 | 100 | 100 | 100 | 100 | 100 | 100 | 100 |
| Diisotridecyl phthalate | 60 | 60 | 60 | 55 | 55 | 55 | 55 | 55 | 55 |
| Atomite (CaCO$_3$) | 20 | 20 | 20 | 20 | 20 | 20 | 20 | 20 | 20 |
| Basic lead silicate sulfate complex | 5 | 5 | — | — | — | — | — | — | — |

TABLE IV-continued

|  | Parts By Weight | | | | | | | | |
|---|---|---|---|---|---|---|---|---|---|
|  | Controls | | Examples | | | | | | |
|  | C | D | 6 | 7 | 8 | 9 | 10 | 11 | 12 |
| Dibasic lead stearate | 0.5 | 0.5 | — | — | — | — | — | — | — |
| Calcined clay | — | 20 | 20 | 20 | 20 | 20 | 20 | 20 | 20 |
| Lead nonylphenolate (24% Pb) | — | — | 5 | 5 | 5 | 5 | 5 | 5 | 5 |
| Stearic acid | — | — | 0.5 | 0.5 | 0.5 | 0.5 | 0.5 | 0.5 | 0.5 |
| Epoxy soybean oil | — | — | 5.0 | 5.0 | 5.0 | 5.0 | 5.0 | 5.0 | 5.0 |
| MgO | — | — | — | 1.0 | 5.0 | — | — | — | — |
| Ca(OH)$_2$ | — | — | — | — | — | 1.0 | 5.0 | — | — |
| Mg silicate | — | — | — | — | — | — | — | 1.0 | 5.0 |

The mixtures were milled on a two-roll mill at 350° F. for three minutes, and then sheeted off. Heat resistance of the resulting compositions was evaluated in terms of the retention of tensile and elongation properties after oven aging for 7 days at 136° C. (ASTM D 2633), and volume resistivity was measured initially and after 1, 3 and 7 days in H$_2$O at 50° C. and 75° C. in accordance with ASTM D 257. The results are tabulated in Tables V and VI.

TABLE V

VOLUME RESISTIVITY ohm-cm × 10$^{13}$

| Example No. | Initial | 50° C. 1 day | 50° C. 3 days | 50° C. 7 days | 75° C. 1 day | 75° C. 3 days | 75° C. 7 days |
|---|---|---|---|---|---|---|---|
| C | 2.54 | 1.10 | 1.41 | 0.81 | 1.98 | 1.77 | 1.14 |
| D | 36.0 | 6.21 | 5.69 | 4.56 | 3.01 | 3.16 | 3.32 |
| 6 | 5.78 | 1.65 | 2.04 | 2.31 | 2.49 | 2.04 | 3.21 |
| 7 | 7.67 | 4.13 | 3.84 | 1.73 | 2.50 | 2.23 | 1.93 |
| 8 | 13.0 | 10.8 | 11.9 | 2.53 | 7.16 | 5.57 | 3.23 |
| 9 | 7.52 | 4.70 | 4.34 | 3.42 | 2.15 | 2.65 | 2.26 |
| 10 | 5.69 | 1.77 | 1.83 | 1.58 | 2.41 | 3.24 | 1.54 |
| 11 | 6.40 | 1.57 | 1.85 | 1.18 | 1.82 | 2.00 | 2.51 |
| 12 | 4.27 | 1.11 | 1.12 | 1.02 | 1.07 | 1.65 | 2.40 |

The data in Table V show that addition of MgO at 5.0 phr significantly improves the volume resistivity imparted by lead nonyl phenolate. Ca(OH)$_2$ at 1.0 phr offers an improvement, but at 5 phr shows a slightly detrimental effect.

While basic lead silicate sulfate complex (Controls C and D) show very high volume resistivity initially, the values fall off rather rapidly upon aging. Lead nonyl phenolate with epoxy (Examples 6 to 12) offer values which are only one-third as high at 50° C., but 81% of the values at 75° C.

TABLE VI

| Heat Resistance | Controls | | Examples | | | | | | |
|---|---|---|---|---|---|---|---|---|---|
|  | C | D | 6 | 7 | 8 | 9 | 10 | 11 | 12 |
| Tensile strength, psi, initial | 2320 | 2400 | 2360 | 2350 | 2380 | 2340 | 2380 | 2350 | 2380 |
| Tensile strength, psi, after 7 days 136° C. | 2450 | 2530 | 2400 | 2410 | 2410 | 2370 | 2410 | 2420 | 2490 |
| Elongation at break, % initial | 260 | 250 | 260 | 260 | 260 | 260 | 250 | 250 | 260 |
| Elongation at break, % after 7 days 136° C. | 195 | 180 | 205 | 210 | 210 | 210 | 200 | 205 | 205 |
| % retention of tensile | over 100 | over 100 | over 100 | over 100 | over 100 | over 100 | over 100 | over 100 | over 100 |
| % retention of elongation | 75 | 72 | 79 | 81 | 81 | 81 | 80 | 82 | 79 |

EXAMPLE 13

Two electrical tape formulations were prepared according to the following composition.

|  | Parts By Weight | |
|---|---|---|
|  | Control E | Example 13 |
| Polyvinyl chloride resin homopolymer (Tenneco 250) | 100 | 100 |
| Sb$_2$O$_3$ | 3 | 3 |
| 1,3-butanediol adipate-laurate Mol. wt 1600 | 51 | 48 |
| Epoxy soybean oil (Drapex 6.8) | — | 3 |
| Dibasic lead stearate | 0.5 | — |
| Lead silicate chloride | 8.0 | — |
| Lead nonyl phenolate (24% Pb) | 0.5 | 8.0 |
| Stearic Acid | — | 0.5 |

The mixtures were milled on a two-roll mill at 350° F. for three minutes, and then sheeted off. Heat resistance of the resulting compositions was evaluated in terms of the retention of tensile and elongation properties after oven aging for 7 days at 136° C. (ASTM D 2633) and dielectric strength was measured in water at room temperature, in accordance with ASTM D1000.

Results of the heat resistance and dielectric strength tests are included in Table VII.

TABLE VII

|  | Control E | Example 13 |
|---|---|---|
| Heat Resistance | | |
| Tensile initial psi | 2800 | 2825 |
| Elongation (%) initial | 325 | 350 |
| Tensile (aged 7 days at 136° C.) psi | 2500 | 2700 |
| Elongation (%) (aged 7 days at 136° C.) | 250 | 300 |
| % retention of initial elongation | 77% | 86% |
| Dielectric strength | | |
| Initial | 1029 volts/mil | 1014 volts/mil |
| Aged in distilled H$_2$O at room temperature (24 hours) | 438 volts/mil | 597 volts/mil |
| Aged in distilled H$_2$O at room temperature (4 days) | 401 volts/mil | 518 volts/mil |
| Aged in distilled H$_2$O at | 401 volts/mil | 567 volts/mil |

TABLE VII-continued

| | Control E | Example 13 |
|---|---|---|
| room temperature (7 days) | | |

The stabilizer compositions of the invention are formulated for use in a wide variety of wire and cable insulation compounds as well as other formulations where solid lead stabilizers are currently being used.

The use of liquid lead alkyl phenolates eliminates the air-borne lead dust problem associated with solid lead stabilizers.

The stabilized resin compositions possess good volume resistivity and insulation resistance properties. In electrical tape applications, dielectric strength equal to solid lead stabilizers can be achieved.

Wire and cable insulation compounds stabilized with these stabilizer compositions exhibit very good heat stability and a low degree of opacification, which will allow the compounder to reduce pigment level in darker colors. Because of low specific gravity, the stabilized compounds will possess low pound volume costs, which will result in substantial savings to the compounder.

Having regard to the foregoing disclosure, the following is claimed as the inventive and patentable embodiments thereof:

1. An electrical grade polyvinyl chloride resin composition suitable for use as electrical insulation material, having a high volume resistivity and a high resistance to deterioration when heated at temperatures above 100° C., comprising as the essential ingredients a polyvinyl chloride resin and, in the amounts indicated, in parts per one hundred of resin, from about 30 to about 100 parts carboxylic acid ester plasticizer; from about 5 to about 25 parts filler; from about 1 to about 20 parts epoxy compound, and from about 1 to about 20 parts lead alkyl phenolate.

2. An electrical grade polyvinyl chloride resin composition according to claim 1 in which the lead alkyl phenolate has the formula:

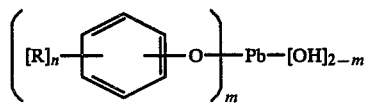

wherein:
R is an alkyl group having from one to about eighteen carbon atoms;
n is a number from 1 to 4; and
m is 1 or 2.

3. An electrical grade polyvinyl chloride resin composition according to claim 2 in which m is 1 and the lead alkyl phenolate is a basic lead alkyl phenolate.

4. An electrical grade polyvinyl chloride resin composition according to claim 3 in which m is 2, and the lead alkyl phenolate is a normal lead alkyl phenolate.

5. An electrical grade polyvinyl chloride resin composition according to claim 4 in which the alkyl is nonyl.

6. An electrical grade polyvinyl chloride resin composition according to claim 2 in which the filler is calcium carbonate.

7. An electrical grade polyvinyl chloride resin composition according to claim 2 in which the filler is clay.

8. An electrical grade polyvinyl chloride resin composition according to claim 2 in which the carboxylic acid ester has the formula:

wherein:
Z is selected from the group consisting of an aliphatic nucleus having from one to about thirty carbon atoms; a cycloaliphatic nucleus having from four to about thirty carbon atoms; and an aromatic nucleus having an aromatic ring structure of six or ten carbon atoms and a total of from six to about thirty carbon atoms;
$R_1$ is an alkyl group having from one to about eighteen carbon atoms; and
$n_2$ is a number from 1 to 4;
and the carboxylic acid ester has a total of from twenty to about 150 carbon atoms, including both the Z and $COOR_1$ groups.

9. An electrical grade polyvinyl chloride resin composition according to claim 8 in which Z is a benzene ring and the structure is

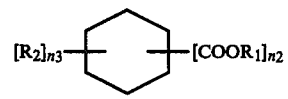

wherein:
$R_2$ is an alkyl group having from one to about eighteen carbon atoms; and
$n_3$ is a number from 0 to 4.

10. An electrical grade polyvinyl chloride resin composition according to claim 9 in which the carboxylic acid ester is selected from the group consisting of di-isotridecyl phthalate, tri-2-ethylhexyl trimellitate, and dioctyl phthalate.

11. An electrical grade polyvinyl chloride resin composition according to claim 8 in which the epoxy compound has from 10 to 150 carbon atoms.

12. An electrical grade polyvinyl chloride resin composition according to claim 11 in which the epoxy compound is an epoxy higher ester having from 22 to 150 carbon atoms.

13. An electrical grade polyvinyl chloride resin composition according to claim 12 in which the epoxy compound is epoxidized soybean oil.

14. An electrical grade polyvinyl chloride resin composition according to claim 13 in which the filler is clay.

15. An electrical grade polyvinyl chloride resin composition according to claim 1 in which the epoxy compound is epoxidized soybean oil, the filler is clay, the carboxylic acid ester is di-isotridecyl phthalate or tri-2-ethylhexyl trimellitate, and the lead alkyl phenolate is normal lead nonyl phenolate.

16. An electrical grade polyvinyl chloride resin composition according to claim 1 wherein the polyvinyl chloride resin is formed at least in part of the recurring group:

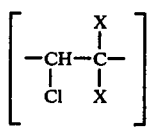

and has a chlorine content in excess of 40%, where X is either hydrogen or chlorine.

17. An electrical grade polyvinyl chloride resin composition in accordance with claim 16 in which the polyvinyl chloride resin is polyvinyl chloride homopolymer.

18. An electrical grade polyvinyl chloride resin composition in accordance with claim 16 in which the polyvinyl chloride resin is a copolymer of vinyl chloride and vinyl acetate.

* * * * *